(No Model.)
J. T. WAINWRIGHT.
ART OF REDUCING UNSMELTED OR PARTLY SMELTED ORE.
No. 350,574. Patented Oct. 12, 1886.
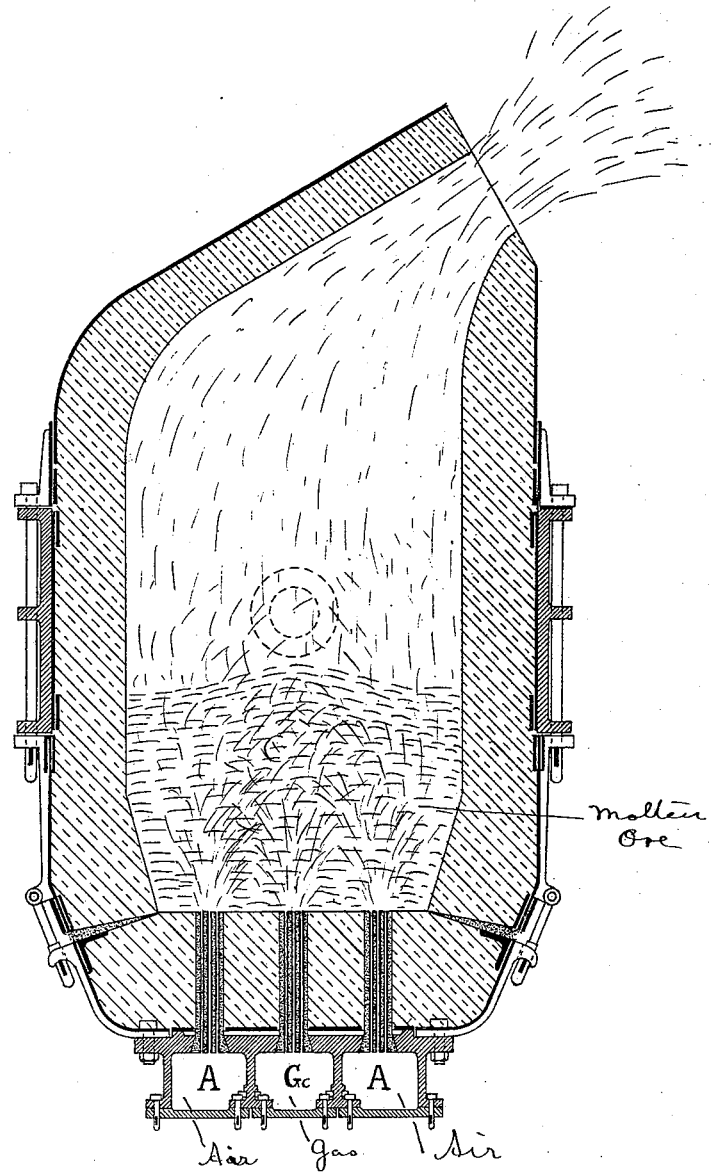
WITNESSES:
INVENTOR
Jacob T. Wainwright

UNITED STATES PATENT OFFICE.

JACOB T. WAINWRIGHT, OF ALLEGHENY, PENNSYLVANIA.

ART OF REDUCING UNSMELTED OR PARTLY-SMELTED ORE.

SPECIFICATION forming part of Letters Patent No. 350,574, dated October 12, 1886.

Application filed January 27, 1886. Serial No. 189,915. (No model.)

*To all whom it may concern:*

Be it known that I, JACOB T. WAINWRIGHT, a citizen of the United States, and a resident of Allegheny, in Allegheny county, Pennsylvania, have invented certain new and useful improvements in the art of reducing unsmelted or partly-smelted ore, including roasted ore, matte, speiss, blast-furnace cinders, and like materials, by the use of gaseous or fluid fuel, of which the following is a specification.

In the above-named art a high degree of heat is required. It has been customary in the production of heat by the combustion of gases or vapors to preheat them, and also the air, by means of hot-blast ovens, or by means of so-called "regenerative furnaces;" but these air and gas heating apparatus are quickly destroyed by the great heat to which they are necessarily exposed, and they are also incapacitated for attaining the higher temperatures by their great loss of caloric through radiation. Furthermore, in the reduction of ores there has been a failure to fully utilize the heat produced by reason of the too great distance between the air or gas heating chamber and the ore or oxide. In this particular my method approximates the usual operation of blast-furnaces and no heat is wasted through the walls of flues, nor is its energy weakened by too wide and extensive a field of radiation.

It has been proposed to melt ore by forcing mingled air and fuel into and through a molten bath, ore being charged in or upon the same as described by Hamilton in United States Patent No. 195,981. This method differs from mine in that the air and fuel are mixed before they are forced into the molten matter. The fuel burns before it reaches the bath, oxygen being present, and there is no preheating due to a separate passage of the air or gas through the molten material or through a portion thereof. Carbonaceous fuel also has heretofore been forced through molten ore to reduce it, and the resulting gases then mingled with air in a furnace charged with ore and solid fuel to melt the ore, as described in patents to Reese, Nos. 55,710 and 57,969. This method differs from mine in that it attempts to melt the ore not in the immediate presence of the gas-heating bath, but in a separate furnace, to which the hot gases are conveyed through an external conduit before they are brought in contact with air for their final combustion. According to my improvement either the air or gas must pass into or through molten matter and be heated thereby before combustion occurs, and said combustion takes place after such heating, and at or near the surface of the molten bath, and in the presence of ore and flux charged upon or into or mingled with said bath. In most cases both the air and gas may be forced through independent tuyeres into the heating-bath. Both fluids necessarily travel through some portion of the molten matter before meeting for combustion, which takes place only above the lower portion of the bath, and ordinarily and preferably near the surface thereof and in the presence of the unmelted charge. If either air or gas alone is forced through the heating-bath, the other of them can be introduced at or near the surface and the ore being charged upon or into the molten mass. The resulting combustion not only reduces the fresh charge, but tends to maintain the heat of the bath, the contents of which are agitated and circulated by the blast.

The accompanying drawing represents an apparatus suitable for the application of my invention, and is substantially the same as that used for making steel by the Bessemer process, with the exception that the bottom is arranged for two distinct blasts, and both trunnions are made hollow for conveying a separate blast to each of the annular blast-boxes at the bottom of the vessel.

It is obvious that other apparatus could be selected or devised for executing my process, and the Bessemer converter is referred to simply as a suitable and well-known instrumentality.

Referring to the figure of the drawing, a blast-box for air or oxygen is represented at A, and one for gaseous or volatile fluid fuel at G. Detachable blast-boxes with detachable covers or plates are shown in the present instance.

In beginning the operation according to my improvement, a bath of molten matter is provided in any usual or convenient manner. Air and gas—one or both—having been heated, as set forth, the gas is burned without any loss of its acquired heat, thereby producing intense combustion, which quickly acts upon the ore which may be charged from time to time upon the molten mass. The amount of combustion and consequent heat can be controlled by regulating the blasts by means of valves or in other known ways. My improvement is consistent with a variation of either the gas or air blast, according to the character and condition of either the bath or the charge, and according to particular effects desired; and it also consists, with the use of mixed gases or of gases with powdered or fluid material, or of air mixed with gas, provided the use of the same is in a manner not inconsistent with the passage of either a combustible gas or the air mingled with gas through molten matter before reaching a point where combustion occurs, whereby either the air or the combustible gas is preheated.

The general plan and machinery that I prefer for working my invention is that used for making steel by the Bessemer process; but it may also require blowing-engines for forcing the gas-blast, and the process for separating the slag and for casting is substantially the same as practiced in Bessemer steel-works; but molds such as are used at blast-furnaces may be used; and, when using my process for the purpose of producing metal that is to be refined by the Bessemer process, it is sometimes desirable to smelt the ore and blow the metal in different vessels, the metal to be taken from the first vessel and delivered into a second one while in a molten state, and there treated by the Bessemer process, and it is sometimes desirable to pass the metal from thence to a third vessel and therein treat it by the basic, Bessemer, or other refining process; or the molten metal may be bessemerized in the vessel described herein by cutting off the supply of gas and introducing steam or air or a mixture of these through the tuyeres.

The fuels that I prefer are natural gas, hydrocarbon gas, or petroleum; but in localities where these are not conveniently attainable gaseous or fluid fuel, made from coal or other carbonaceous matter by any of the known processes, may be employed.

It is sometimes desirable during certain stages of my process to introduce steam into both or either of the blasts, in order to reduce the temperature in the vessel, and also to induce certain chemical reactions; and it is also sometimes desirable to introduce a carbonaceous gas or fluid, with or without steam, into both of these blasts, for the purpose of reducing the metal from the ore and to induce reactions. In changing these blasts care must be taken to expel the contents of the blast-boxes by introducing steam before admitting air or fuel, in order to obviate the danger of an explosion.

To prevent an accident that might be caused by carelessness, the mechanism for actuating the blast-valves may be connected with an interlocking device to automatically perform the above-mentioned operation when changing the blasts.

I prefer the inside lining of my vessel to be in part or in whole of graphite, ganister, or bauxite; or, if it is desired to produce a basic slag for refining the metal, as by fluxing with lime or fluor-spar or other ingredients, then I may employ linings such as are customarily used in a converting vessel or furnace when making steel by any of the basic processes.

In reducing the metal from certain ores by my process it is sometimes desirable to mix graphite or other solid carbonaceous matter with the charge of ore and flux in order to induce chemical reaction. The said reaction is aided by the heat resulting from the combustion of gaseous or volatile fluid fuel, as set forth.

I am aware that air and vapor have been drawn into a vessel containing ore by an exhaust-jet and the gas burned therein. Such jet would diminish the pressure of a molten bath, if one were produced in the vessel, and would tend to diminish its heating effect. A more serious defect, however, of this method consists in the formation of a separate conduit for air through the ore after it is partially fused, so as to cohere to some extent, the air having the effect to chill the ore and prevent its fusion as it passes through the above-mentioned conduit without meeting with gas until they mingle above the ore. In actual practice this evil has prevented complete fusion of the ore. According to my method, as described and hereinafter claimed, air and gas are introduced under such conditions that combustion must occur at or below the surface of the molten matter, so that the operation cannot be defeated by the formation of chilled chimneys in the ore. The ore may be charged upon a bath already provided; but if the ore is first charged into the vessel, and the bath produced by melting a part of the same, then for the complete fusion of the remainder air and gas should both be introduced at the bottom of the vessel to insure combustion at or below the surface of the bath as soon as produced, whereby the separate passage of the blast or current through semi-fused ore tending to chill the same is avoided.

Having described my invention, what I desire to claim and secure by Letters Patent is—

1. In the art of reducing unsmelted or partly-smelted ore, the improvement which consists in providing a molten bath charged with ore, and passing both air and gaseous or volatile fuel in separate but simultaneous blasts into the molten matter, whereby the air and fuel are preheated and then burned below or near the charge, substantially as set forth.

2. In the art of reducing unsmelted or partly-smelted ore, the improved process which consists in providing a molten bath, subsequently charging it with ore, passing air and gaseous or volatile fuel in separate but simultaneous blasts into the molten matter, whereby the air and fuel are preheated and then burned below or near the surface of the bath and near the charge, substantially as set forth.

3. In the art of reducing unsmelted or partly-smelted ore, the improved process which consists in providing a molten bath, subsequently charging it with ore, passing air into the molten matter, whereby the air is preheated, and supplying gas to be burned at or near the surface of the bath and below or in the presence of the charge, substantially as set forth.

4. In the art of reducing unsmelted or partly-smelted ore, the improved process which consists in providing a molten bath, subsequently charging it with ore, passing gaseous or volatile fuel into the molten matter, whereby this fuel is preheated, and supplying air to produce combustion below or in the presence of the charge, substantially as described.

JACOB T. WAINWRIGHT.

Witnesses:
J. P. NAUGHTON,
J. P. THEGER.